United States Patent [19]

Quin

[11] Patent Number: 5,347,798
[45] Date of Patent: Sep. 20, 1994

[54] HARVESTING APPARATUS

[75] Inventor: Bernard J. Quin, Triabunna, Australia

[73] Assignee: Frish Pty. Ltd., Tasmania, Australia

[21] Appl. No.: 976,996

[22] PCT Filed: Aug. 1, 1991

[86] PCT No.: PCT/AU91/00336
  § 371 Date: Apr. 2, 1993
  § 102(e) Date: Apr. 2, 1993

[87] PCT Pub. No.: WO92/02691
  PCT Pub. Date: Feb. 20, 1992

[30] Foreign Application Priority Data
  Aug. 3, 1990 [AU] Australia ............... PK1549

[51] Int. Cl.⁵ ........................... A01D 44/00
[52] U.S. Cl. ........................................ 56/8
[58] Field of Search ........................... 56/8, 9

[56] References Cited

U.S. PATENT DOCUMENTS

| | | |
|---|---|---|
| 3,237,774 | 3/1966 | Schuback . |
| 3,268,081 | 1/1964 | Menkee et al. . |
| 3,698,163 | 10/1972 | Kelpin ........................... 56/9 |
| 3,744,257 | 7/1973 | Spanner . |
| 3,752,317 | 8/1973 | Lithen ........................... 210/242 |
| 3,980,559 | 9/1976 | Netzell ........................... 210/83 |
| 4,942,722 | 7/1990 | Desrosiers ........................... 56/8 |
| 5,031,390 | 7/1991 | Bryant ........................... 56/8 |
| 5,121,708 | 6/1992 | Nuttle ........................... 47/1.4 x |
| 5,161,354 | 11/1992 | Sygen et al. ........................... 56/8 |

FOREIGN PATENT DOCUMENTS

| | | |
|---|---|---|
| 077048 | 4/1983 | European Pat. Off. . |
| 521884 | 6/1975 | Japan . |
| 54-129690 | 10/1979 | Japan . |
| 106563/64/65 | 1/1954 | New Zealand . |
| 196491 | 12/1981 | New Zealand . |
| 210643 | 3/1987 | New Zealand . |
| 2145005 | 3/1985 | United Kingdom . |

Primary Examiner—Terry Lee Melius
Attorney, Agent, or Firm—Oliff & Berridge

[57] ABSTRACT

A harvesting apparatus includes an inlet capable of engaging a body of water, a first separating stage and a control device. The control device is operable to control the flow rate of water over the inlet to the first separating stage. The control device operates by adjusting either the first separating stage or the inlet to control the flow of water to the first separating stage.

25 Claims, 5 Drawing Sheets

HARVESTING APPARATUS

The present invention relates generally to a harvesting apparatus, and relates particularly to a harvester and separator for use in a water environment. Particularly, the harvesting apparatus of this invention is suitably used in conjunction with a water vessel. More particularly the harvesting apparatus is capable of collecting surface or near-surface water, and of separating therefrom matter contained therein.

The matter to be separated may be any type of matter such as plankton, whether it be zooplankton or phytoplankton, dispersed oil from oil spills or the like, or even flotsam such as discarded rubbish or other solid pollutants. Further description of the invention will generally relate to the harvesting of zooplankton from a mass of water such as the waters of seas, rivers, ponds, and lakes or the like.

Plankton are small animal and plant organisms having weak locomotive power, which float or drift in the water and which form an integral part in the aquatic food chain. Various aquacultural installations particularly those involved with the culture of marine species such as prawn farms, demand a reliable supply of live zooplankton. This in turn may demand the harvesting, separation, and concentration of plankton. To date, fixed harvesting and separating systems have been proposed but those have inherent disadvantages and limitations.

Zooplankton naturally employ spacial and temporal variability as a defense against predators. They do not remain in one location, and may appear in or disappear from an area in the water mass at random thus ensuring survival. As such, known harvesting and separating systems cannot provide efficient harvesting as they either lack flexibility or volume. Specifically, a system having a large pumping facility is very difficult to relocate when required, while systems having the ability to be portable generally have pumping systems which are of low volume.

Further, known harvesting devices extract water with entrained plankton from a pond or the like, and either recirculate the water back to the pond, or dump the water elsewhere. The latter method has obvious problems of having to continually re-fill the pond, and the former method requires extra piping and usually creates unwanted currents away from the inlet which disperse the accumulated plankton. Both options also cause the serious problem of dilution of the water, with respect to both the volume and location of the plankton.

An object of the present invention is to obviate, or at least partially alleviate, the above disadvantages of known harvesting and separating systems.

The present invention provides a harvesting apparatus including an inlet means capable of selectively engaging a body of water at or near the surface thereof;
at least a first separating stage;
said apparatus being operable to allow water to flow over the inlet means to the at least one first separating stage by relative movement between the inlet means and the body of water;
a pivotal communication between said inlet means and said first separating stage capable of independent vertical movement; and
control means able to be co-ordinated with the pivotal communication; and operable to control the flow rate of water over said inlet means to said first separating stage, and able to be co-ordinated so as to adjust the height, depth or angle of the first separating stage relative to the surface of the body of water.

It is preferred that the inlet means and first separating stage are in pivotal communication with each other, and are capable of relative movement to each other. It is most preferred that the control means is operable to control this movement. The pivotal communication may be provided by a direct pivotal axis between the inlet means and first separating stage, however, it is most preferred this pivotal communication is provided by an interim platform placed between the inlet means and first separating stage with each of said inlet means and first separating stage capable of separate pivotal movement from the interim platform. The control means may be operable to raise or lower the interim platform.

The inlet means may be of a variety of forms, but most preferably of a form capable of creating at least a wash over the first separating stage. For example, when incorporated into a water vessel the inlet means may be a free flowing inlet means having an opening directed forwardly of the vessel, which receives water due to the relative movement between the vessel and the body of water. Alternatively, the inlet means may be a pump-fed inlet means or the like. Another alternative is to provide a bar, such as a rounded bar that simply creates a wash when placed in or on the surface of the body of water. The creation of a wash should be sufficient to provide a flow of water over the first separating stage. Preferably, the inlet means is of the scoop type, and is a relatively wide scoop having a forwardly directed leading edge, and being capable of pivotal movement from an inoperative position, such as one out of the water, to an operative position in fluid communication with the water.

According to a preferred aspect of the invention, the, or a first separating stage comprises a primary screen classifier having a substantially flat surface, an upstream end pivotably connected to the inlet means, and a downstream end having an associated collection trough. The primary screen classifier should be capable of separating water from substantially all matter of a size greater than a predetermined minimum size, and to retain the matter on the primary screen classifier.

Water from the inlet means may pass over the primary screen classifier. The primary screen classifier may include a mesh having a predetermined aperture size that will allow water and undersized matter to pass through. The screen may alternatively be a filter screen to assist the separation of oil from water. The matter that is larger than the predetermined size will remain on the primary screen classifier. This matter may then be collected and stored, or alternatively may undergo further separation and classification.

In a further preferred form, the primary screen classifier of the, or a first separating stage includes a primary collection trough located at the downstream end of the primary screen classifier, away from the upstream end where the water enters the primary screen classifier. By increasing the flow rate over the primary screen classifier, the matter separated from the water which remains on the primary screen classifier may be flushed therefrom into the collection trough.

Preferably the flush water is an increased volume of water from the inlet means which is caused to wash over the primary screen classifier at a rate too fast to allow passage of the water through the screen, but fast enough to wash off the primary screen classifier substantially all of the matter collected thereon. The flush water serves to wash the matter so separated into the collection trough, where that matter together with the flush water may be transferred by pump or other means to further separating stages or to storage means such as holding tanks or the like. The apparatus may be connected to a water vessel having hulls, and conveniently, the holding tanks may be located in these hulls. The volume and frequency of the flush water is dependent upon both the concentration of matter in the water and the rate at which separation is being effected.

The inlet means and primary screen classifier should be capable of pivotal movement between an operative position, where, in use a steady flow of water is maintained over the primary screen classifier, and a flush position where the pivotal movement of either or both of the inlet means and primary screen classifier will cause an increase in water flow over the primary screen classifier.

The control means is operable to control the rate of water across the first separating stage, and hence the primary screen classifier. Generally, the control means may take the form of acting upon either or both of the inlet means and first separating stage, to pivot either and hence alter the flow rate. In a preferred form, the control means may work on and lower the downstream end of the first separating stage. In this way, the primary screen classifier may be pivoted to increase the slope thereof to cause a rush of water of increased flow rate, which subsequently washes the primary screen classifier and flushes matter into the collection trough. The primary screen classifier may be returned to its original position to resume normal operation in an operative position. Of course, the original position may be horizontal or may be at an angle, again depending on operating conditions.

In a further preferred form, the inlet means may be combined with the first separating stage to allow for coordinated action between these two components. The inlet means is arranged upstream of the first separating stage, and in one form both are pivotally attached to an interim platform or the like, about which each is capable of separate pivotal movement. The interim platform should be able to be raised or lowered, which may provide control of the angle of the inlet means and first separating stage relative to each other. Of course the interim platform may be omitted and the scoop may be pivotally attached directly to the upstream end of the primary screen classifier, or to an interim construction of the first separating stage so that each is capable of separate pivotal movement about a common axis. The common axis itself is capable of being raised or lowered.

The flowrate of water over the inlet means and thus over the primary screen classifier, and also the flowrate of the flush water, may then be controlled by the control means by pivoting the scoop to adjust the angle thereof (and thus the depth below the surface of the water), and also by pivoting the primary screen classifier to adjust its angle. Further control may be provided by raising or lowering the interim platform in a substantially vertical plane. Alternatively, and where the interim platform is omitted, the pivotal axis between the first separating stage and inlet means is capable of being raised or lowered. In use control of this pivotal connection between the first separating stage and inlet means, allows for control of the angle of each component and hence of the flow rate over the primary screen classifier.

It is preferred in an operable position that the first separating stage is maintained substantially flat, on or just above the surface of the water as the action of the water acting on the screen of the primary screen classifier helps to keep it free of matter clogging the screen.

The pivotal communication connecting the first separating stage and inlet means may be raised or lowered in response to changes in weight, or operating depth of the apparatus due to filling or emptying of the collection troughs. In use, as the collection troughs are either filled or emptied, the depth of the first separating stage may alter relative to the surface of the body of water, or indeed the relative angle of the first separating stage may be effected. By raising or lowering the pivotal communication between the first separating stage and inlet means, separately, or in conjunction with changes to the height at the downstream end of the first separating stage, this change in depth or angle may be compensated for and maintain the first separating stage substantially flat and at a level on or just above the surface of the body of water. Similarly, the downstream end of the inlet means may be adjusted in response to those same changes in weight and consequently depth, to maintain it at approximately the same level on, or just below the surface of the body of water. It will generally be a co-ordinated action between various control means to maintain the downstream end of the inlet means and the first separating stage relatively flat and at a level near the surface of the body of water.

The control means that controls the pivotal movement of the scoop and the primary screen classifier, and also the vertical movement of the pivotal communication thereof, may comprise any known operable means. Preferably, the control means comprises separate hydraulic rams, secured to lines attached to the free ends of the scoop and the primary screen classifier respectively or at the pivotal communication, to raise and lower those free ends and cause the pivotal movement. A manual mechanism, such as a hand operated worm drive, may be used to provide the vertical movement. However, it will be understood that any mechanism, automatic or manual, hydraulic or electric, may be utilized to provide the required movement.

The apparatus may be attached to a water vessel, preferably in the form of a catamaran, and may be of a size enabling it to be readily transportable over land such as by being towed on a suitable trailer behind a vehicle. In this form, the inlet means and first separating stage of the harvesting apparatus of the present invention may both be located between the twin hulls of the catamaran. Indeed, in a most preferred form, the apparatus is provided between the hulls, and is secured a short distance above the surface of the water, to allow the movement described above. The operating water may then be removed from the body of water, and immediately returned to the body of water after passing through the primary screen classifier, requiring little energy due to the small displacement of the water above the surface and the short path of travel through the system.

It should also be understood that a third degree of control of the flowrate through the system is provided by the propulsion of the vessel through the water, which allows either an increase or decrease in flowrate depending on water conditions such as currents and the like. In a preferred form, the vessel derives its propulsion when in the water from an out-board motor or the like, located and secured in a normal manner.

Preferably, when used as a zooplankton harvestor the matter collected in the primary collection trough is passed to a secondary separator to achieve further separation and classification. Accordingly, the present invention may include a second separating stage comprising;

at least a first separator screen;
    and transfer means operable to transfer said slurry collected from the primary screen classifier to the first separator screen.

The secondary separator preferably comprises three tiered separating screens, arranged so that successive classification occurs from the first to the second to the third, and so that classified matter may be collected from each one separately and subsequently be passed to storage or holding bays.

The matter from the primary collection trough is preferably pumped therefrom to a an outlet located over the first of the tiered separating screens of the secondary separator. The outlet ejects the matter in slurry form over the first screen. Preferably, the screen is a mesh having an aperature, which is sized to collect matter of a predetermined size and to allow matter of a smaller size together with substantially all of the water of the slurry to pass therethrough. The smaller size matter and the slurry water may pass to a second screen where matter of a successively smaller size is collected. This operation continues to the third screen after which the slurry water and any remaining unwanted matter is allowed to return to the body of water.

Preferably, each of the screens are inclined and at the lower end of each screen collection troughs are provided which receive the classified matter. In order to wash the classified matter from the screens into those troughs clean-water spray nozzles may be provided thereabove. The clean-water spray nozzles may be fed from the water which has passed through the primary screen classifier, a separate reservoir associated with the first separating stage or may be drawn from the body of water through a pipe with a filter, preferably a 63 micron filter cartridge. This water may be pumped by a separate pump from that which pumps the slurry to the outlet. A suitable location for the inlet for the pump is immediately below and at one end of the first separating stage.

The primary screen classifier may include a belly-plate associated with the primary screen classifier having a number of apertures therethrough, one of which may be connected directly to a sump or the like for collection of water for the clean-water spray nozzles.

In a further preferred form, the apertures of the belly-plate may be provided with venturi baffles projecting below the surface thereof. The primary screen classifier may then be operated at a level where the belly-plate contacts the surface of the mass of water causing a venturi effect through the primary screen to increase separation efficiency.

All of the controls for the pumps and operating members of the vessel are preferably housed in a central control point so that a person may pilot the vessel and also control the harvesting and separating operation. Alternatively, some or all of the operations of the vessel may be done by remote control, such as by an operator located on shore.

An example of a practical arrangement of the present invention will now be described with reference to the accompanying drawings. However, it is to be understood that the following description in no way limits the generality of the invention as described above.

In the drawings:

FIG. 4 is a front-view along section IV—IV of FIG. 3;

FIG. 5 is a top view of the primary screen classifier of FIG. 3;

Figure 1:
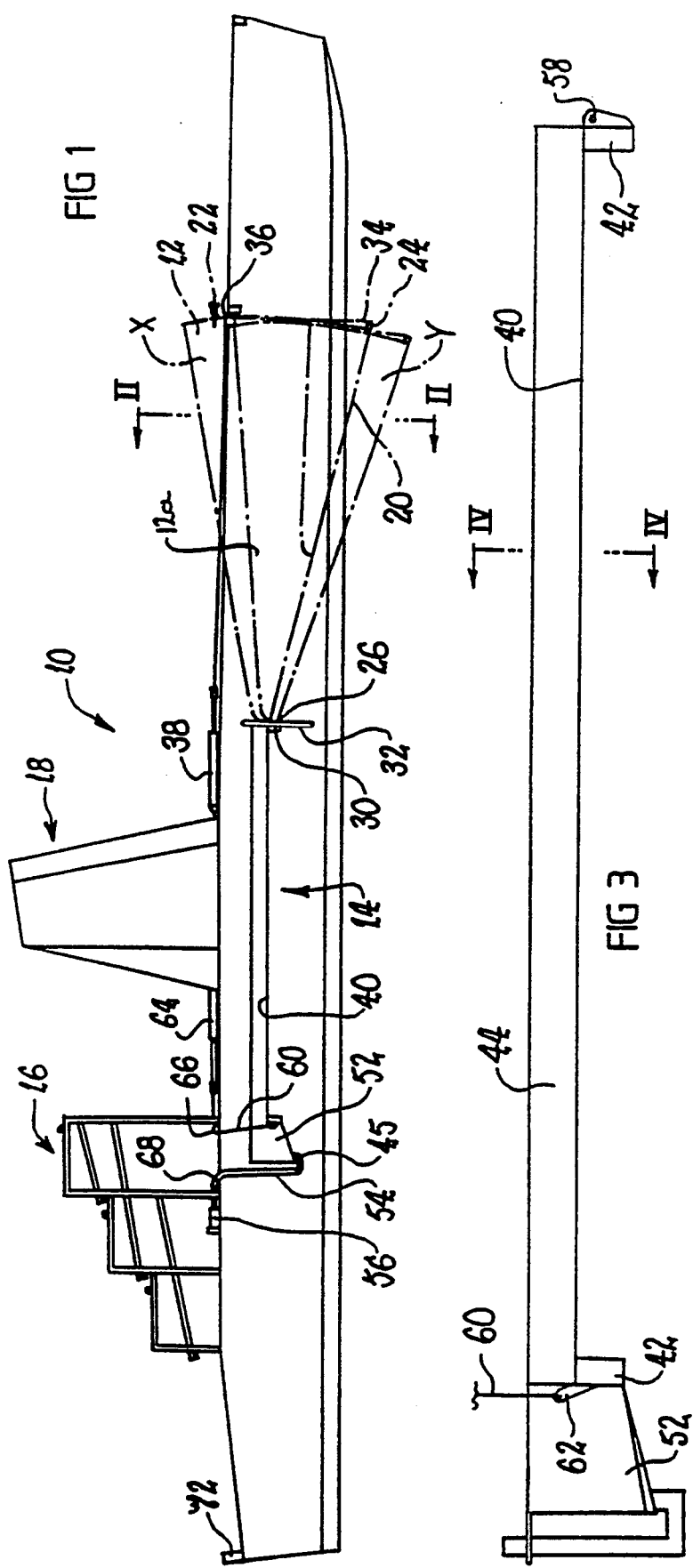
FIG. 1 is a side-view in section of a harvesting vessel according to a preferred embodiment of the present invention.

Illustrated in FIG. 1 is a harvesting vessel (indicated generally as 10) according to the present invention having an inlet means 12, a first separating stage 14, a second separating stage 16, and a central control area 18.

Figure 2:
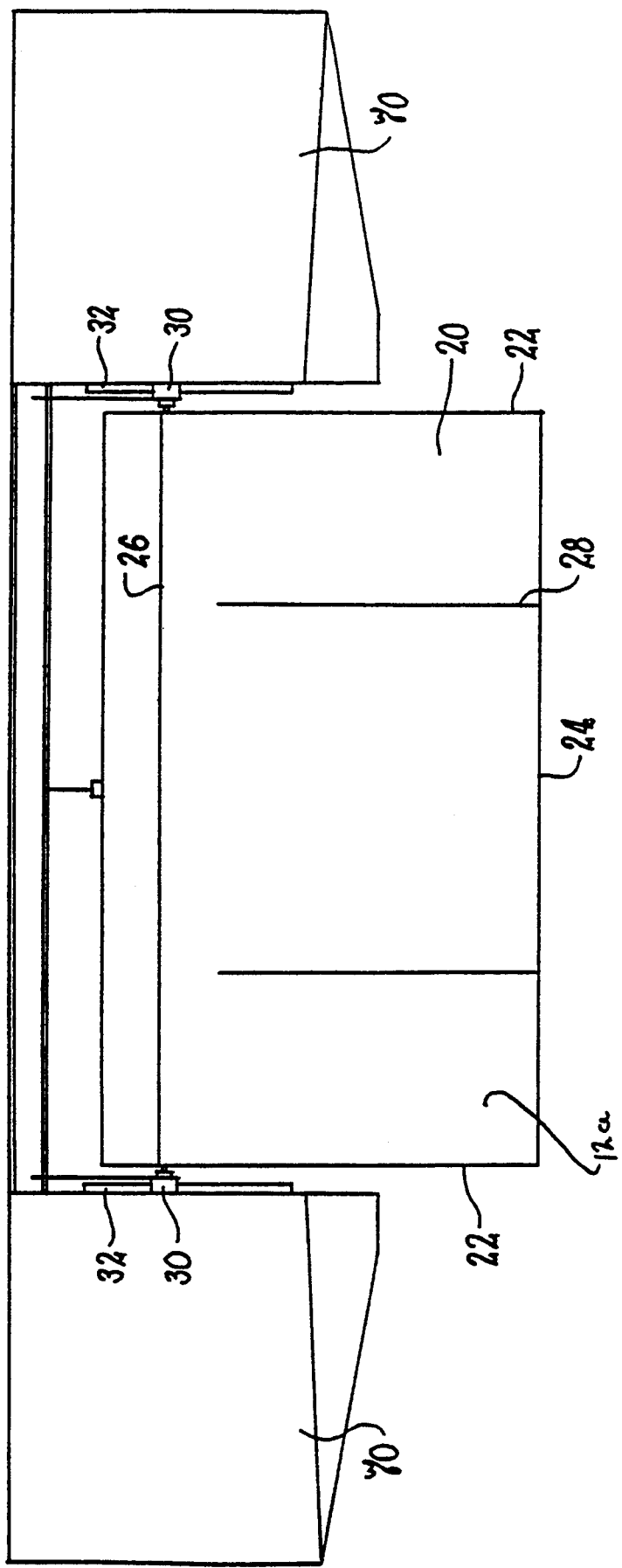
FIG. 2 is a front-view along section II—II of FIG. 1.

Inlet means 12 is a scoop 12a having a bottom wall 20, side walls 22, a leading edge 24, and a trailing edge 26 (better illustrated in FIG. 2). Baffles 28 are provided to assist flow of water thereover (baffles 28 are shown in FIG. 1 in outline only). FIG. 1 also shows the inlet means 12 in both a raised X position, and a lowered Y position.

The trailing edge 26 is pivotally attached to guide means 30, which also allows vertical movement of trailing edge 26 along runners 32. The vertical movement may be controlled manually by a hand operated winding mechanism such as a worm-drive or the like (not shown). The leading edge 24 of the inlet means 12 is secured by a line 34 via pulley 36 to a hydraulic ram 38. Ram 38 is controlled within control area 18 to either lower or raise the scoop 12a.

Figure 3:
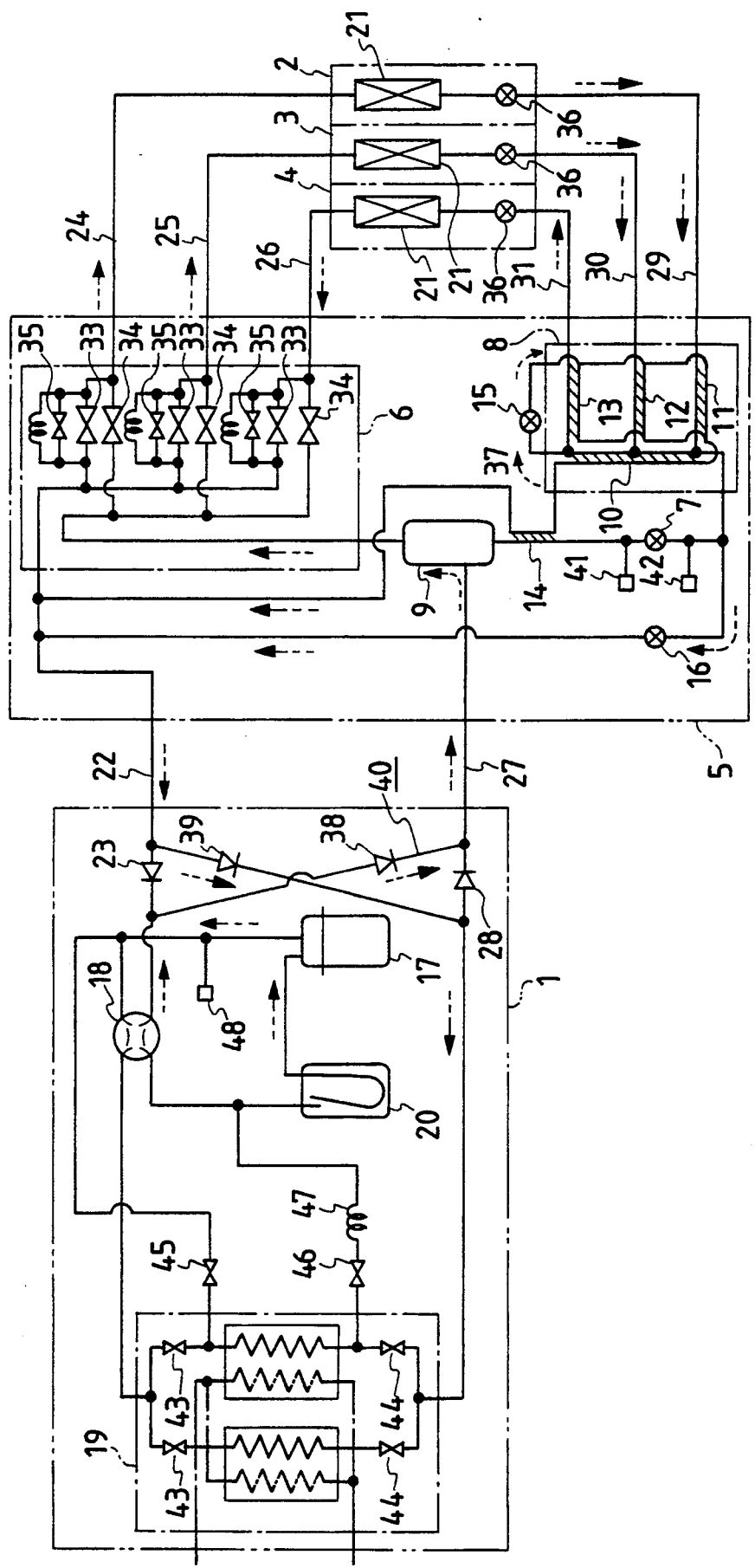
FIG. 3 is an enlarged side-view of the primary screen classifier of FIG. 1.
Figure 6:
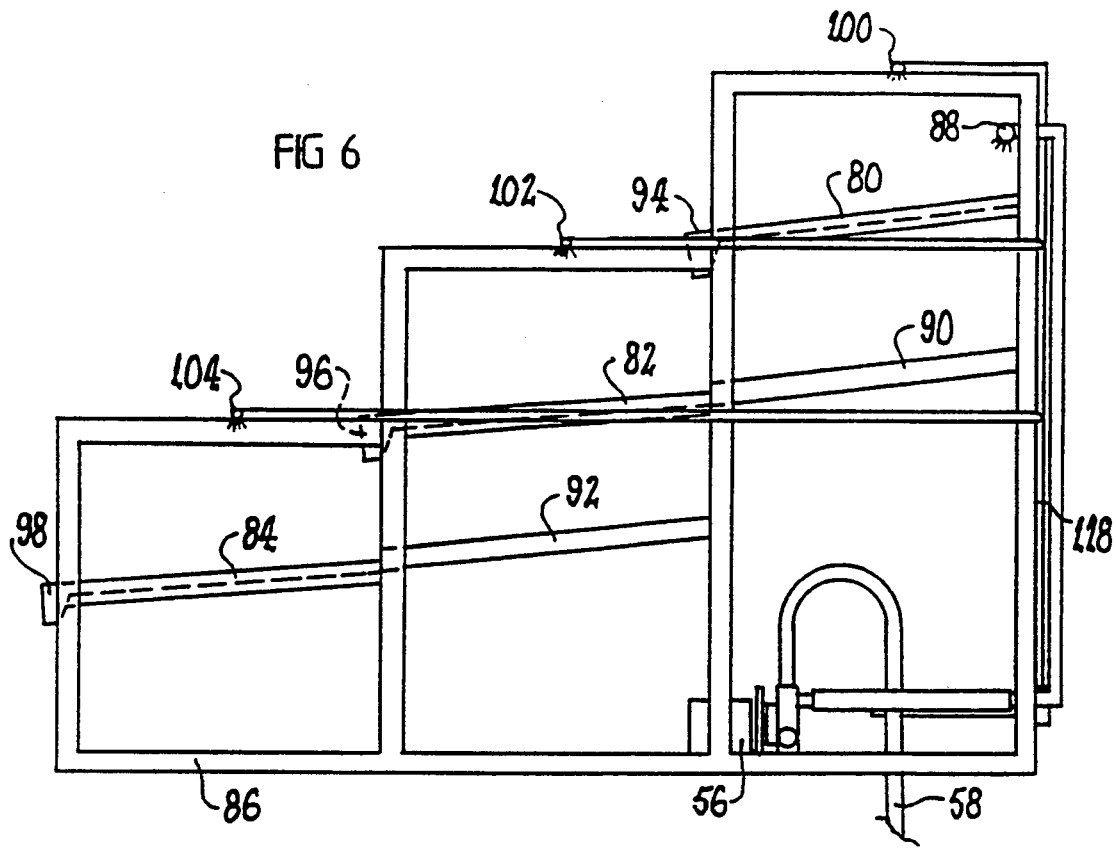
FIG. 6 is an enlarged side view of the secondary separator of FIG. 1.
Figure 7:
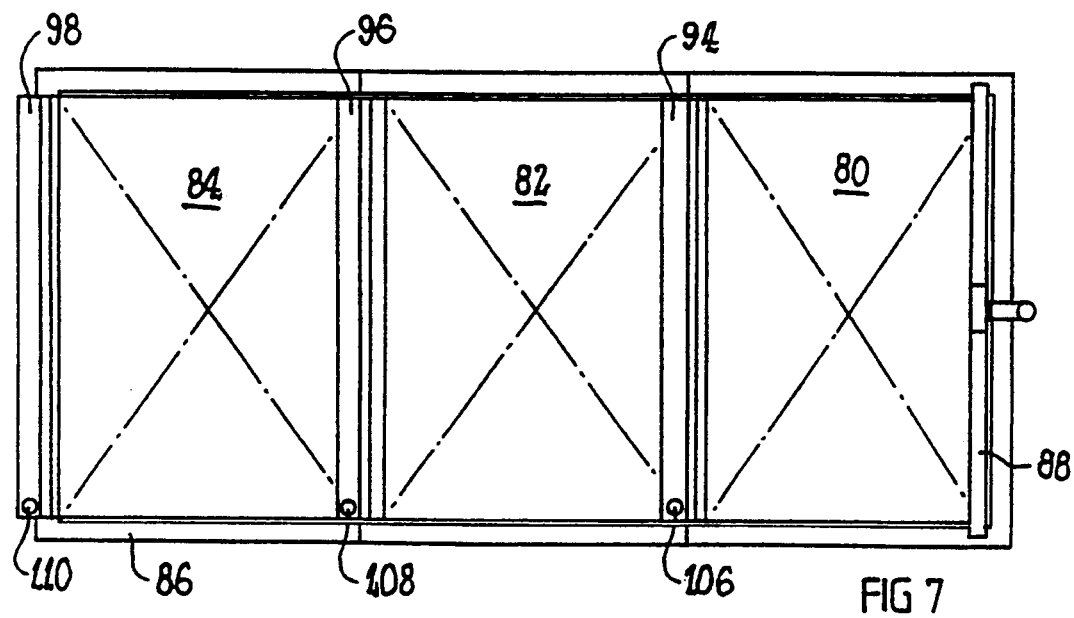
FIG. 7 is a partial top view of the secondary separator of FIG. 6.
Figure 9:
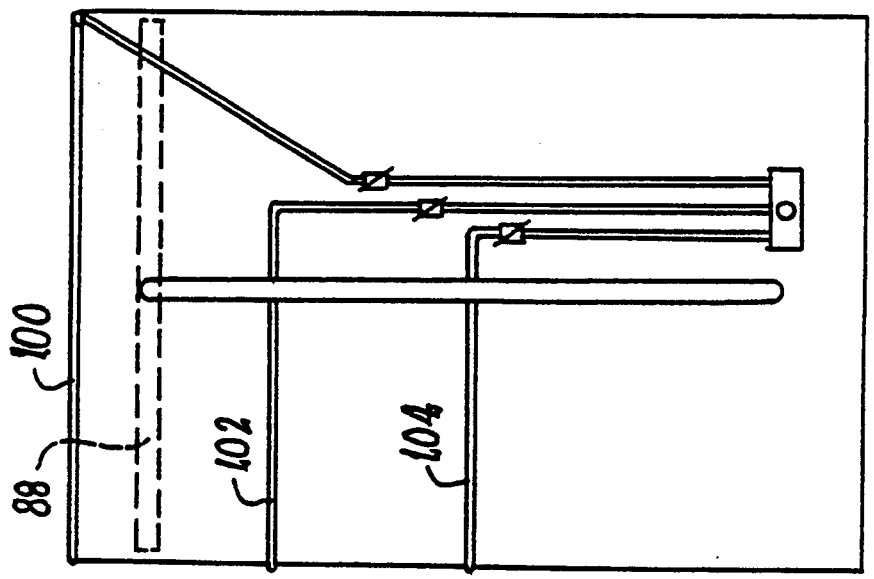
FIG. 9 is a partial front view of the secondary separator of FIG. 6.
Figure 8:
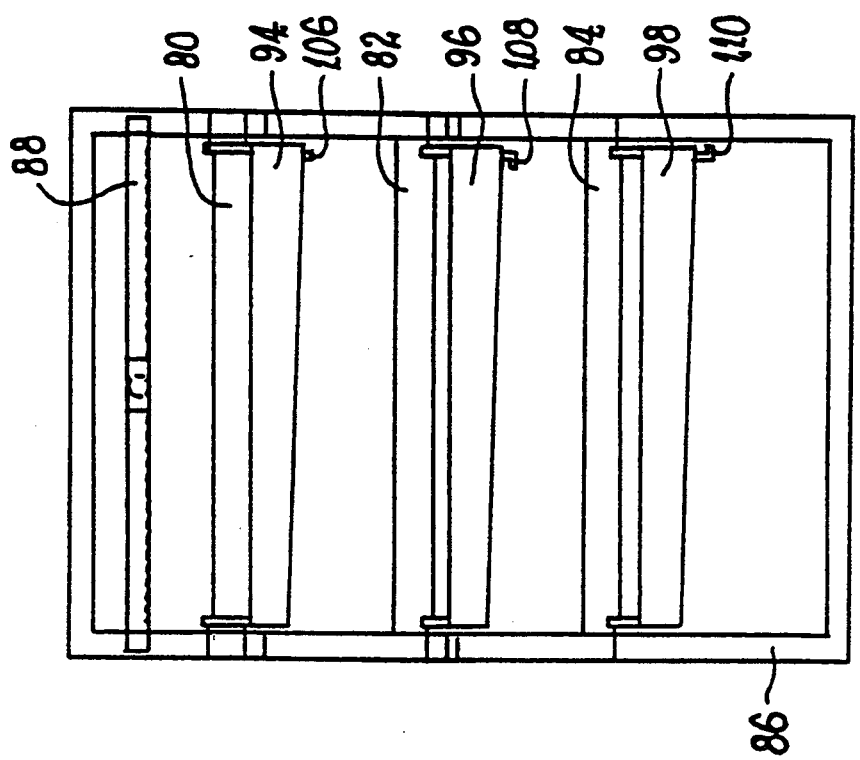
FIG. 8 is a rear view of the secondary separator of FIG. 6.

The first separating stage 14 is illustrated in FIGS. 3, 4, and 5 and includes primary collection trough 52, and a primary screen classifier 40. The primary screen classifier is supported on side and end frame members 42, and stringers 44.

The primary collection trough 52 is located immediately adjacent the downstream end of the primary screen classifier 40. Piping 54 communicates with exit hole 58 so that a slurry may be pumped from collection trough 52 via pump 56 to the secondary separating stage 16.

The first separating stage 14 is also pivotally attached to guide means 30, and to the inlet means 12 at axis 58. Thus, the primary screen classifier 40 may be pivotally raised and lowered about axis 58, by a line 60 secured at flange 62, and passing to hydraulic ram 64 via pulley 66. The position of the upstream end of the primary screen classifier 40 is also able to be vertically raised and lowered in conjunction with the trailing edge 26 of the scoop 12. It should be noted that the first separating stage 14 is preferably in one rigidly secured piece, and thus pivots as a whole. In order to allow this pivotal movement piping 68 from the primary collection trough 52 to pump 56 is flexibile.

The apparatus of the invention may be located between twin hulls 70 of a vessel 10 (best shown in FIG. 2). In operation, the vessel 10 of the present invention is piloted across waters by normal steering controls such as a rudder or the like (not shown) and is propelled by an out-board motor or the like (also not shown) secured to the vessel at point 72. The vessel 10 may be directed to an area of water in a pond or lake or the like where plankton, such as zooplankton, are at or near the surface thereof. Once at that area of water, the scoop 12a may be lowered into the water to a depth at which the zooplankton are located, and which provides a required flowrate of water thereover and to the first separating stage 14. The water has plankton encapsulated therein, and the required flowrate of water over the scoop 12a will be dependent on the concentration and depth of that plankton. However, the operator will generally be visually guided by observing the amount of plankton collecting on the primary screen classifier 40, and the speed with which the water is passing therethough.

The water and encapsulated plankton pass over scoop 12, across the gap between scoop 12 and the primary screen classifier 40 (which gap is covered by a layer of mylar fairing 74 or the like—as shown in FIG. 5), and onto the primary screen classifier 40. Preferably, the primary screen classifier 40 is a stainless steel woven mesh having apertures therein comensurate with the size of matter to be separated. Thus, substantially all of the water passes through the mesh together with matter less than the size of the aperture. Matter larger than the size of the aperture is retained by the mesh.

Periodically, the primary screen classifier 40 is flushed by water from the scoop 12 in order to wash accumulated plankton into primary collection trough 52. Pump 56 may operate periodically or continuously while scoop 12a is lowered, and is capable of pumping collection trough 52 dry without incurring any damage. Therefore, once the primary screen classifier 40 is flushed and a slurry of plankton and water enter the collection trough 52, pump 56 passes that slurry through piping 54 and 58 to the second separating stage 16.

The primary screen classifier 40 is flushed by activating ram 64 to lower the downstream end of, and thus pivot, the entire first separating stage 14 to increase the slope thereof. The flowrate may by increased further at the same time by activating ram 38 to increase the depth of the leading edge 24 of scoop 12. In any event, the flowrate over primary screen classifier 40 is caused to increase such that substantially all of the accumulated plankton washes into primary collection trough 52. Further control of the flowrate may be provided by altering the vertical height of guide means 30.

Illustrated in FIGS. 6 to 9 are various views of the second separating stage 16. The second separating stage 16 includes three tiered separating screens, namely first screen 80, second screen 82, and third screen 84, all supported in a framework generally indicated by the numeral 86. As illustrated by the top-view of FIG. 7, the three screens are each relatively wide, approximately to the half the width of the primary screen classifier 40, although they may be wider.

The slurry from primary collection trough 52 is passed via piping 58 and pump 56 to an outlet 88 which extends across the width of first screen 80. Outlet 88 discharges the slurry onto screen 80, and depending on the size of screen selected (which in turn generally depends on the particular use of the vessel, and the size of plankton required), plankton larger than the screen aperture are retained, while smaller plankton passes through the screen to the second screen 82 via fixed tray direction plate 90. A similar operation occurs from second screen 82 to plate 92, and from third screen 84. However, anything passing through third screen 84 returns directly to the body of water between hulls 70 and downstream of the first separating stage 14.

Once trapped on an appropriate screen, the different sized plankton is rinsed into respective collection troughs 94, 96, and 98 by respective clean-water spray nozzles 100, 102, and 104. The water for the clean-water spray nozzles may be provided by a separate smaller pump. The water is drawn from that water leaving the first separating stage 14, or from a reservoir which is connected to an intake pipe 118 or directly from water body through a filter cartridge. The clean water is preferred to prevent blockage of the relatively fine apertures of the nozzles 100, 102, and 104.

From collection sumps 94, 96, and 98 the plankton drains via outlets 106, 108, and 110 to graded holding tanks which may be located in either or both of the hulls 70 of the vessel. From those holding tanks, the graded plankton may be passed directly to fish ponds or into vehicle mounted tanks for transportation.

Thus it will be appreciated that the harvesting vessel 10 of the present invention has the advantage of being able to locate and follow plankton within one large water body or between different bodies of water so that continuous harvesting and separating can be effected. This can be achieved without dispersing the remaining plankton, and without being limited to plankton in only one location, providing adaptability for various types and locations of plankton.

A further advantage lies in the preferred relationship between the inlet means and the first separating stage. The ability to raise or lower the leading edge of the scoop, to adjust the height of the hinge point between the scoop and the primary screen classifier, and to adjust the slope of the primary screen, all improve the efficiency of the vessel. The various combinations of angles which may be achieved have an effect on the depth from which plankton can be harvested, the volume of water passing over the scoop, the rate and efficiency of filtration over the primary screen classifier, and the rate and concentration of plankton into the primary collection trough. Various of these considerations are important for various harvesting conditions.

The present invention gives flexible, high volume harvesting, by a portable and easily deployable machine. The machine has the ability to operate between widely dispersed areas either within a single large water mass or between different water masses. Further, large pumps and complex machinery are not required to filter large volumes of water.

It will be appreciated that various modifications and alterations may be made to the above described harvesting vessel without departing from the ambit of the present invention.

I claim:

1. A harvesting apparatus including an inlet means capable of selectively engaging a body of water at or near the surface thereof;
   at least a first separating stage;
   said apparatus being operable to allow water to flow over the inlet means to the at least one first separating stage by relative movement between the inlet means and the body of water;

a pivotal communication between said inlet means and said first separating stage capable of independent vertical movement; and control means, able to be coordinated with the pivotal communication, and operable to control the flow rate of water over said inlet means to said first separating stage, and able to be coordinated so as to adjust the height, depth or angle of the first separating stage relative to the surface of the body of water.

2. An apparatus according to claim 1 wherein said pivotal communication includes an interim platform;
said inlet means and said first separating stage being pivotal from said interim platform.

3. An apparatus according to claim 1 wherein said control means is operable to pivot said inlet means and said first separating stage between
an operative position, where in use a steady flow of water will pass over the first separating stage; and
a flush position, where pivotal movement of either or both of said inlet means and said first separating stage will, in use, cause an increase in the flow of water across the first separating stage.

4. An apparatus according to claim 1 wherein said inlet means is a scoop having a forwardly directed upstream leading edge; and
a downstream end pivotably connected to the pivotal communication;
said scoop being pivotable between an operable position in fluid communication with the body of water and an inoperable position.

5. An apparatus according to claim 4 wherein the control means is operable to adjust the vertical height, relative to the body of water of the downstream end of the first separating stage, the upstream end of the inlet means and the pivotal communication.

6. An apparatus according to claim 1 wherein said first separating stage comprises;
a primary screen classifier having a substantially flat surface;
an upstream end pivotably connected to said pivotal communication; and
a downstream end having an associated collection trough;
said primary screen classifier being capable of separating water from substantially all matter of a size greater than a predetermined minimum size, and to retain said matter thereon.

7. An apparatus according to claim 1 wherein the inlet means is a rounded or angled bar, and in use creates a wash to flow over the first separating stage when placed in or on the surface of the body of water and there is forward movement of the apparatus relative to the body of water.

8. An apparatus according to claim 6 wherein said control means is operable to pivot the primary screen classifier so that the downstream end is in a lower position relative to the upstream end to provide a gradient, which, in use is sufficient to increase the flow rate of water across the primary screen classifier, without increasing the volume of water passing on to the upstream end of the primary screen classifier.

9. An apparatus, according to claim 6 wherein said control means is operable to raise or lower the interim platform between the inlet means and first separating stage, to respond to changes in depth of the inlet means and the first separating stage due to changing weight of the apparatus in use and to adjust the downstream end of the first separating stage to maintain the primary screen classifier substantially flat at a level on, below or just above the surface of the body of water, and to maintain the downstream end of the inlet means at approximately the same level.

10. An apparatus according to claim 9 wherein the control means is operable to maintain the first separating stage and downstream end of the inlet means relatively flat relative to the surface of the body of water, and adjust the height, depth or angle of the first separating stage relative to the surface of the water.

11. An apparatus according to claim 6, wherein said control means is operable to raise or lower the pivotal communication between the inlet means and first separating stage, and operable to alter the gradient of one or both of the inlet means and first separating stage relative to the surface of the body of water, which in use, is sufficient to alter the flow rate of water across the primary screen classifier.

12. An apparatus according to claim 6 wherein the increase in flow rate of water across the primary screen classifier in use is sufficient to flush matter retained or the primary screen classifier to the associated collection trough.

13. An apparatus according to of claim 6 wherein said primary screen classifier includes a flat mesh tray having an aperture of predetermined size.

14. An apparatus according to claim 1 wherein said control means is a hydraulic ram in communication with a free end of either or both of the first separating stage and inlet means or the pivotal communication between the first separating stage and inlet means.

15. An apparatus according to claim 6 including a second separating stage, said second separating stage comprising;
at least a first separator screen;
and transfer means operable to transfer slurry collected in said collection trough associated with the primary screen classifier to said first separator screen.

16. An apparatus according to claim 15 wherein said second separating stage comprises a plurality of separator screens in a tiered arrangement, each separator screen including;
a substantially flat first mesh tray adapted to retain matter larger than a predetermined size;
said tiered arrangement operable so that matter and water that passes through said first separator screen passes to at least a second separator screen including a second mesh tray;
said second mesh tray comprising a predetermined smaller aperture than said first mesh tray to retain matter larger than a predetermined size.

17. An apparatus according to claim 16 wherein the tiered arrangement includes at least a third separator screen;
said third separator screen having a third mesh tray with a successively predetermined smaller aperture;
each of said separator screens including an associated collection trough, where in use each of said mesh trays retains matter larger than a predetermined size, separating the matter according to size.

18. An apparatus according to of claim 15 wherein said transfer means comprises a pump.

19. An apparatus according to claim 17 wherein the second separating stage includes;

flush means operable to provide sufficient water to flush matter retained on each separator screen to each respective associated collection trough.

20. An apparatus according to claim 19 wherein said flush means comprises a pump operable to pump water to said separator screens from a reservoir associated with said first separating stage, or through a micro filter.

21. An apparatus according to claim 1 wherein said apparatus is attached to a water vessel capable of forward movement.

22. An apparatus according to claim 21 wherein said forward movement of said water vessel creates a flow of water over the inlet means to the first separating stage;
    said flow being able to be controlled by the forward movement of the vessel.

23. An apparatus according to of claim 6 wherein the matter retained is plankton.

24. An apparatus according to claim 1 wherein the apparatus is used to separate oil from water.

25. A twin hull water vessel including an apparatus according to claim 1 wherein said apparatus is positioned between said hulls of the vessel such that forward movement of the vessel will create a flow over said inlet means.

* * * * *